United States Patent [19]

Oikawa et al.

[11] Patent Number: 5,226,324
[45] Date of Patent: Jul. 13, 1993

[54] ANGULAR VELOCITY SENSOR

[75] Inventors: Takahiro Oikawa; Yoshihito Aoki; Naoto Ishikawa, all of Shizuoka, Japan

[73] Assignee: Yazaki Corporation, Tokyo, Japan

[21] Appl. No.: 553,013

[22] Filed: Jul. 16, 1990

[30] Foreign Application Priority Data

Jul. 24, 1989 [JP] Japan .................................. 1-188725

[51] Int. Cl.$^5$ .............................................. G01P 9/04
[52] U.S. Cl. ........................................................ 73/505
[58] Field of Search ............................ 73/505; 310/351

[56] References Cited

U.S. PATENT DOCUMENTS 4,836,023 6/1989 Oikawa ................................ 73/505

FOREIGN PATENT DOCUMENTS 60-178313 9/1985 Japan ..................................... 73/505
61-191918 8/1986 Japan ..................................... 73/505

Primary Examiner—John E. Chapman
Attorney, Agent, or Firm—Sughrue, Mion, Zinn, MacPeak & Seas

[57] ABSTRACT

An angular velocity sensor for detecting angular velocity by converting deflection caused by the coriolis force into an electrical signal. The sensor includes a vibratory member having at least three main surfaces including a first main surface having a driving transducer provided thereon, and second and third surfaces substantially perpendicular to the first main surface respectively, and being parallel to each other, the second and third main surfaces having detecting piezoelectric transducers, respectively. Additionally, support members are connected to the second and third main surfaces to respectively support vibration-steady points of the vibratory member. At least one longitudinal end portion of the vibratory member has a cross-section in such a manner that a length between the second and third main surfaces is shorter than a length of the first main surface. In this manner, the sensitivity of the angular velocity sensor is improved.

4 Claims, 3 Drawing Sheets

ANGULAR VELOCITY SENSOR

BACKGROUND OF THE INVENTION

This invention relates to an angular velocity sensor for detecting an angular velocity by converting deflection, caused by the Coriolis force, into an electrical signal.

A conventional angular velocity sensor of this general type is of such a construction as shown in FIGS. 6 and 7 which are a perspective view thereof and an end view thereof, respectively. More specifically, the angular velocity sensor comprises a vibratory member 1 in the form of a pillar-like metal beam of a square cross-section, piezoelectric transducers 2a to 2d affixed respectively to main surfaces 1a to 1d of the vibratory member 1, and support members 3a and 3b supporting the vibratory member 1 at respective vibration-steady points A and B of the vibratory member 1.

In the angular velocity sensor of the above construction, the vibratory member 1 is driven in a sinusoidal wave by the piezoelectric transducer 2a, affixed to the main surface 1a, to be vibrated, and in this condition, when an angular velocity is applied about a longitudinal axis Y of the vibratory member 1, the amplitude and phase increase in accordance with the applied angular velocity, and also a force (Coriolis force) sinusoidally varying at the vibration frequency of the vibratory member 1 develops in a direction perpendicular to the main surface (driving surface) 1a. As a result, vibrations are generated by this Coriolis force in the vibratory member 1 in a direction perpendicular to the driving direction at the same frequency as the driving frequency. The vibrations induced in the vibratory member 1 by this Coriolis force are detected by the piezoelectric transducer 2b affixed to the main surface 1b perpendicular to the driving surface 1a, and the magnitude of the angular velocity is detected through the amplitude and phase of the thus detected vibrations.

The piezoelectric transducers 2c and 2d affixed respectively to the main surfaces 1c and 1d are used for feedback and damping purposes, respectively.

The Coriolis force is expressed by the following formula (1):

$$F_c \propto -2m(\omega \times V) \tag{1}$$

where m represents the mass of the vibratory member 1, $\omega$ represents a vector of the angular velocity, and V represents a vector of the vibration speed. The vibration speed represented by the absolute value $|V|$ of the vibration speed vector are proportional to the vibration amplitude $\xi$ and the vibration frequency $f_n$ as shown in the following formula (2):

$$|V| \propto \xi \cdot f_n \tag{2}$$

On the other hand, in the conventional angular velocity sensor employing the above vibratory member 1 of a square cross-section, in an ideal condition in which the vibratory member 1 is not supported by the support members, the frequency of vibration of the vibratory member 1 in a Z-direction (that is, the resonant frequency $f_{DR}$ on the driving side) is equal to the frequency of vibration in a X-direction (that is, the resonant frequency $f_{RO}$ on the detecting side). Actually, however, the support members 3a and 3b are fixed in the X-direction, and this constitutes a load on the vibrations. Therefore, the vibration frequency $f_{DR}$ in the X-direction is higher several tens to about one hundred Hz than the vibration frequency $f_{OR}$ in the Z-direction.

Further, when the vibratory member 1 is vibrated in the Z-direction, the Coriolis force appears in the X-direction as can be appreciated from the above formulas (1) and (2), and its frequency is $f_n$, and in the vibratory member of a square cross-section, the following is established:

$$f_n = f_{DR}$$

However, since the resonant frequency on the detecting side is different from the resonant frequency on the driving side as described above, the following is established:

$$f_n = f_{DR} \neq f_{RO}$$

And besides, since the difference between the frequencies $f_n$ and $f_{RO}$ is large, the detecting sensitivity has been poor.

This detecting sensitivity can be improved by increasing the Coriolis force $F_c$ (shown in the formula (1)) which produces the output.

However, in the angular velocity sensor of the conventional construction shown in FIGS. 6 and 7, if the width W, the height H or the length l of the vibratory member 1 is merely increased in order to increase the mass m, the vibratory member 1 can not vibrate easily, so that the vibration speed vector V becomes smaller. This necessitate a greater driving power, and there is encountered another problem that the vibratory member 1 itself is increased in size, thus increasing the size of the sensor.

In order to increase the Coriolis force by increasing the vibration speed vector V, it is considered to increase the vibration amplitude $\xi$ or the vibration frequency $f_n$ in connection with the above formula (2); however, the vibration amplitude and the vibration frequency $f_n$ are in opposite relation to each other, and when the vibration frequency $f_n$ is increased, the vibration amplitude is decreased. Therefore, the Coriolis force $F_c$ can not be increased by increasing the vibration speed vector V.

Accordingly, in the angular velocity sensor of the above conventional construction, it has been difficult to improve the sensitivity by increasing the Coriolis force $F_c$.

SUMMARY OF THE INVENTION

In view of the above problems of the prior art, it is an object of this invention to provide an angular velocity sensor in which the sensitivity is improved without increasing the Coriolis force.

The above object has been achieved by an angular velocity sensor comprising a vibratory member in the form of a pillar-like metal beam; driving and detecting transducers affixed respectively to main surfaces of said vibratory members disposed perpendicular to each other; and support members connected to said main surface having said detecting piezoelectric transducer affixed thereto and a main surface disposed in opposed relation to said main surface to respectively support vibration-steady points of said vibratory member; CHARACTERIZED in that:

at least one end portion of said vibratory member has a rectangular cross-section in such a manner that one side of said rectangular cross-section interconnecting said main surfaces to which said support members are connected is smaller than other side.

In the above construction, at least one end portion of said vibratory member has a rectangular cross-section in such a manner that one side of said rectangular cross-section interconnecting said main surfaces to which said support members are connected is smaller than other side. Therefore, the load in the direction of the vibration detected by the detecting piezoelectric transducer is reduced, and the increase of the load due to the support members is eliminated.

As a result, the resonant frequencies in the driving direction and the detecting direction of the vibratory member including the support members approach each other, so that the relation between the vibration frequency $f_{DR}$ (the resonant frequency in the driving direction) due to the piezoelectric transducer, the frequency $f_n$ of the Coriolis force equal to $f_{DR}$, and the resonant frequency $f_{RO}$ in the detecting direction is expressed by $f_{DR} = f_n \simeq f_{RO}$.

DETAILED DESCRIPTION OF THE PREFERRED EMBODIMENTS

Figure 6:
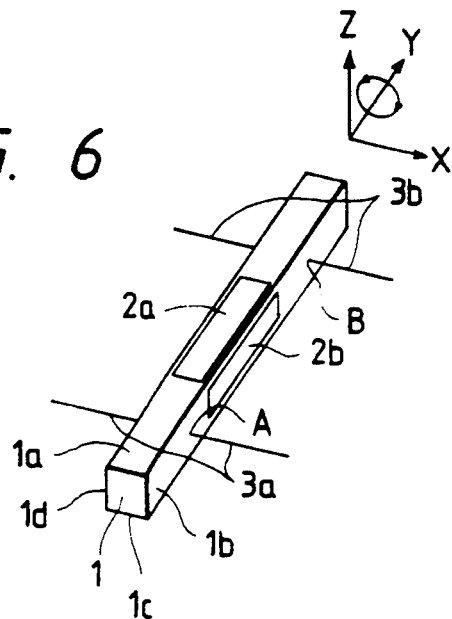
FIGS. 6 and 7 are a perspective view and an end view of a conventional angular velocity sensor, respectively.
Figure 7:
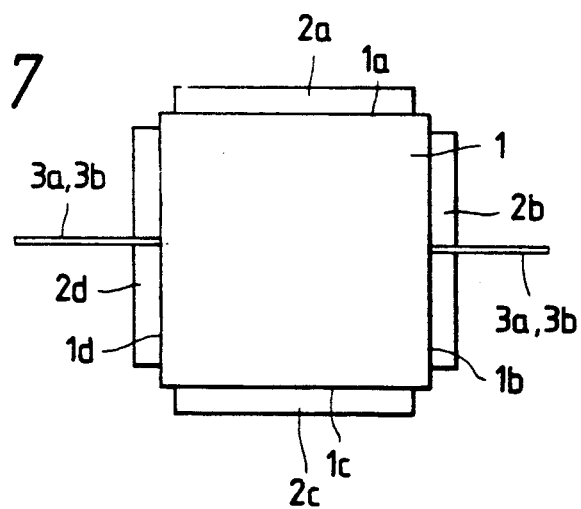

Preferred embodiments of the present invention will now be described with reference to the drawings. Corresponding portions in these embodiments and the prior art of FIGS. 6 and 7 are denoted by the same reference numerals, respectively.

Figure 1:
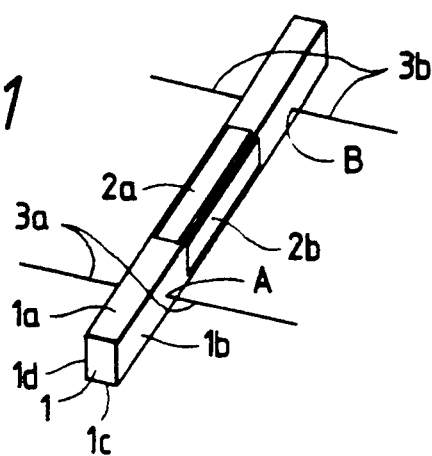
FIG. 1 is a perspective view of one preferred embodiment of an angular velocity sensor of the present invention.

FIG. 1 is a perspective view of one preferred embodiment of an angular velocity sensor of the present invention. In this embodiment, a vibratory member 1 has a rectangular cross-section at any arbitrary point in its longitudinal direction, and one side of this rectangular cross-section interconnecting main surfaces 1b and 1d to which support members 3a and 3b are connected is smaller than other side.

Figure 2A:
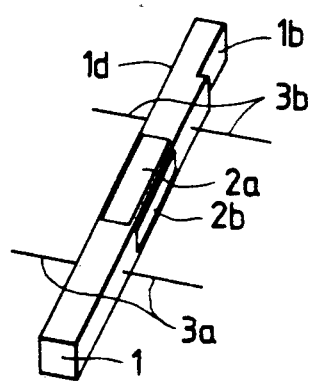
FIGS. 2(a) to 2(c) and 3(a) to 3(c) are perspective views of other embodiments of angular velocity sensors of the invention, respectively.
Figure 2B:
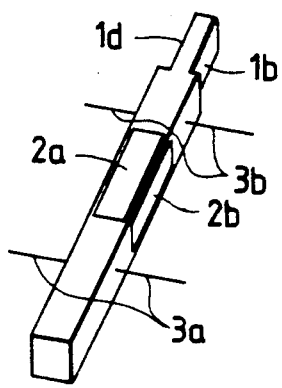
Figure 2C:
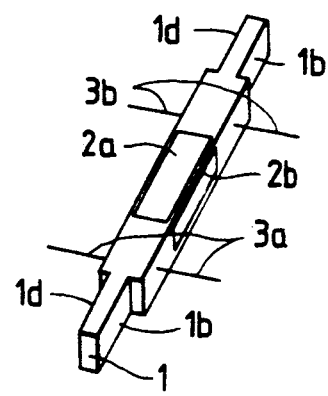

FIGS. 2(a) to 2(c) are perspective views of other embodiments of the invention, respectively. In these embodiments, one or both longitudinal end portions of a vibratory member 1 are rectangular in cross-section. In the example shown in FIG. 2(a), part of a main surface 1b is cut away at one end portion, so that the one end portion has a rectangular cross-section, and in the example shown in FIG. 2(b), main surfaces 1b and 1d are partially cut away at one end portion, so that the one end portion has a rectangular cross-section, and in the example shown in FIG. 2(c), main surfaces 1b and 1d are partially cut away at opposite end portions, so that the opposite end portions have a rectangular cross-section.

Figure 3A:
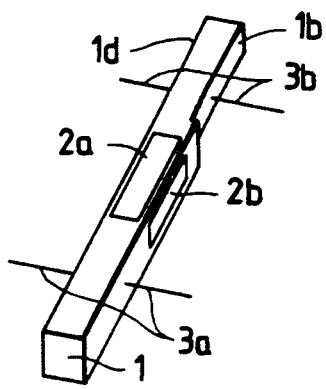
Figure 3B:
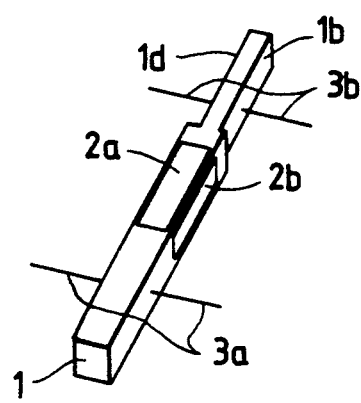
Figure 3C:
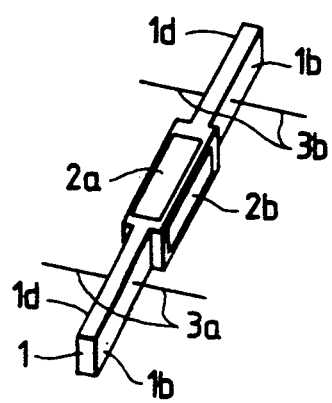

FIGS. 3(a) to 3(c) are perspective views of further embodiments, respectively. In these embodiments, one or both longitudinal end portions of a vibratory member 1 to which support members 3a and 3b are connected are rectangular in cross-section. In the example shown in FIG. 3(a), part of a main surface 1b is cut away at one end portion, so that the one end portion has a rectangular cross-section, and in the example shown in FIG. 3(b), main surfaces 1b and 1d are partially cut away at one end portion, so that the one end portion has a rectangular cross-section, and in the example shown in FIG. 3(c), main surfaces 1b and 1d are cut away at the opposite end portions, so that the opposite end portions have a rectangular cross-section.

As described above for FIGS. 1 to 3, the vibratory member 1 has the rectangular cross-section such that one side of this rectangular cross-section interconnecting the main surfaces 1b and 1d is smaller than other side. With this arrangement, the vibratory member 1 is liable to be flexed in a detecting direction, that is, in the directions of the support members 3a and 3b. Therefore, a large difference (which is caused by the loads of the support members 3a and 3b) between the resonant frequency in the detecting direction and the resonant frequency in the driving direction is eliminated, so that the frequency of the Coriolis force approaches the resonant frequency in the detecting direction. Therefore, the driving by the Coriolis force in the detecting direction is effected efficiently, thereby improving the sensitivity.

As described above for FIGS. 2 and 3, since one or both longitudinal end portions of the vibratory member 1 are rectangular in cross-section, the central portion to which piezoelectric transducers are affixed is in a bulged condition, so that this portion has a relatively greater mass. Therefore, the flexibility in the detecting direction is further enhanced, and also the areas of the piezoelectric transducers affixed to the vibratory member 1 are not decreased, and therefore the driving force is not lowered.

Further, as described above for FIG. 3, since one or both longitudinal end portions of the vibratory member 1 to which the support members 3a and 3b are connected are rectangular in cross-section, through holes for passing the pin-shaped support members 3a and 3b therethrough can be formed in the vibratory member 1 accurately and easily.

A more specific example of the vibratory member 1 of a rectangular cross-section will now be described in connection with the embodiment of FIG. 1.

Figure 4:
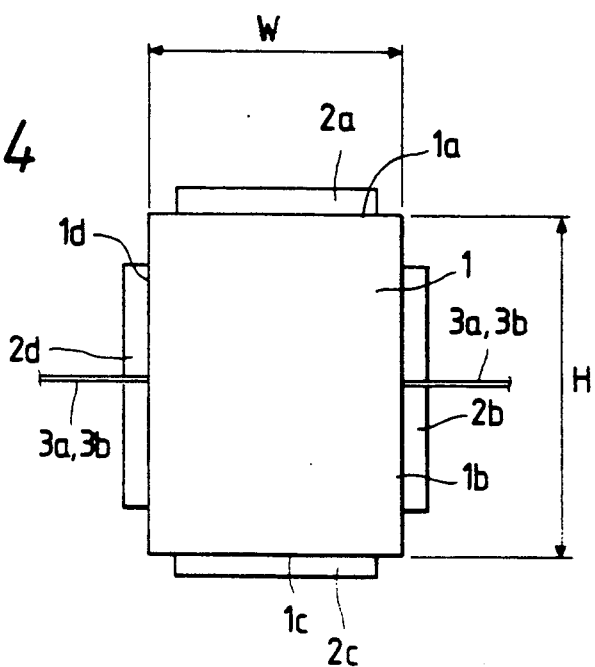
FIG. 4 is an end view of the angular velocity sensor of FIG. 1.

FIG. 4 is an end view of the angular velocity sensor of FIG. 1. As is clear from this Figure, the vibratory member 1 in the form of a pillar-like metal beam is such that its widthwise dimension W perpendicular to the main surfaces 1b and 1d to which the support members 3a and 3b are fixed is smaller than its heightwise dimension H perpendicular to the main surfaces 1a and 1c.

The ratio (W/H) of the dimension W to the dimension H was changed variously without changing the material of the vibratory member 1, the construction and material of the support members 3a and 3b, the length l of the vibratory member 1, the cross-sectional area of the vibratory member 1, and etc. As a result, output voltage ratios (v/vo) shown in Table below were obtained with respect to the various dimension ratios, where the output voltage ratio in the case of the vibratory member of a square cross-section was 1. vo was a reference value, and was so determined that when the dimension ratio was 1, the ratio of the output voltage v to the voltage vo was 1.

| Dimension Ratio (W/H) | Output Voltage Ratio (v/vo) |
| --- | --- |
| 3.000 | 0.12 |
| 2.000 | 0.23 |
| 1.300 | 0.44 |
| 1.000 | 1.00 = vo |
| 0.995 | 2.18 |
| 0.9875 | 3.58 |
| 0.980 | 6.90 |
| 0.975 | 1.91 |
| 0.950 | 1.14 |
| 0.925 | 0.59 |
| 0.750 | 0.37 |

Figure 5:
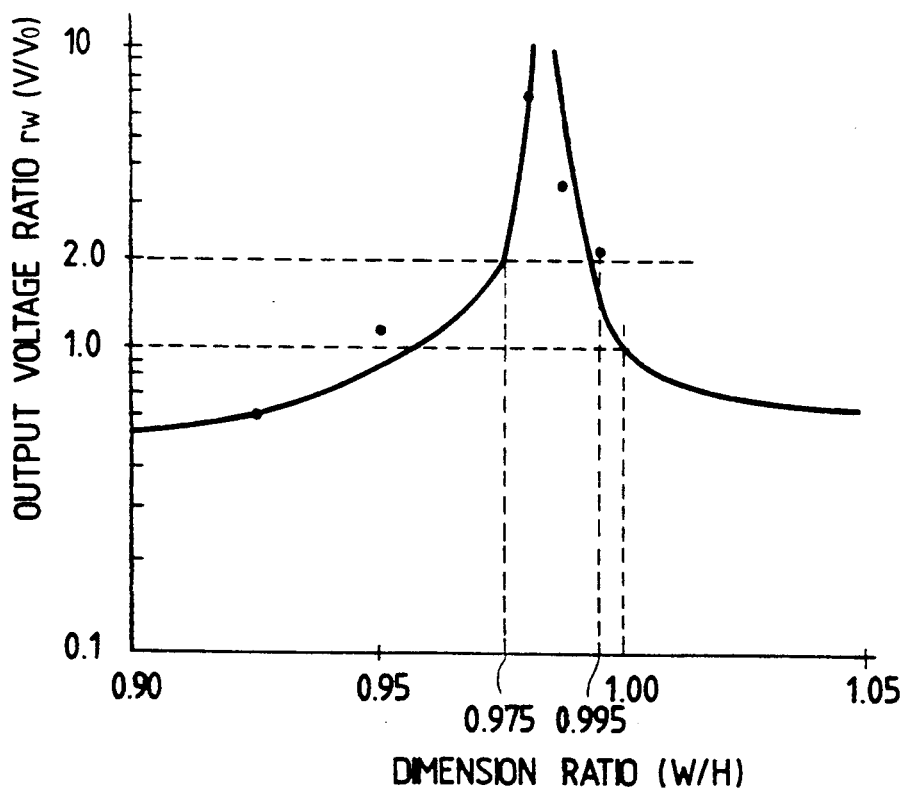
FIG. 5 is a graph showing the relation between a dimension ratio and an output voltage ratio with respect to a vibratory member of the embodiment of FIGS. 1 and 4.

FIG. 5 is a graph depicted in accordance with the above Table. As can be seen from this graph, with respect to the vibratory member 1 of a rectangular cross-section shown in FIG. 4, when its dimension ratio (W/H) is in the range of between 0.975 and 0.995, its sensitivity is more than about two times higher than that of the vibratory member of a square cross-section.

In the above Table and the graph of FIG. 5, the output voltage ratio is worse at the dimension ratio of 0.925 than at the dimension ratio of 1. It is considered that the reason for this is that the load becomes too small as the result of the decrease of the widthwise dimension W of the vibratory member 1, so that the resonant frequency $f_{RO}$, on the detecting side greatly deviates from the frequency $f_n$ of the Coriolis force.

Therefore, when performing the embodiments of FIGS. 2 and 3, it is necessary, as described above for FIG. 1, that the dimensions W and H should be so determined that the output voltage ratio (v/vo) is at least two times greater than the dimension ratio (W/H).

As described above, in the present invention, the resonant frequencies in the driving direction and the detecting direction of the vibratory member 1 including the support members are caused to approach each other, not by increasing the Coriolis force, but by rendering at least one end portion of the vibratory member into a rectangular cross-section, so that the relation between the vibration frequency $f_{DR}$ (the resonant frequency in the driving direction) due to the piezoelectric transducer, the frequency $f_n$ of the Coriolis force equal to $f_{DR}$, and the resonant frequency $f_{RO}$ in the detecting direction is expressed by $f_{DR}=f_n \simeq f_{RO}$. Therefore, the vibratory member can be efficiently vibrated by the Coriolis force produced by the driving piezoelectric transducer, thereby improving the sensitivity.

What is claimed is:

1. An angular velocity sensor, comprising:
   a vibrating member having at least four sides, second and third sides of said vibrating member opposing one another and being perpendicular to a first side thereof, the length of said second and third sides being longer than said first side at at least one longitudinal end portion of said vibrating member;
   a driving transducer disposed on said first side of said vibrating member for applying vibration thereto in a driving direction;
   detecting transducers respectively disposed on said second and third sides of said vibrating member for detecting vibrations of said second and third sides in a detecting direction when said vibrating member experiences angular velocity, said vibrations detected by said detecting transducers being indicative of the angular velocity of said vibrating member; and
   support members connected to said second and third sides of said vibrating member to support said member wherein the lengths of said sides are selected to compensate for said support members such that the resonant frequency in the driving direction is substantially equal to the resonant frequency in the detecting direction.

2. An angular velocity sensor as claimed in claim 1, wherein said end portion of said vibratory member has a rectangular cross-section.

3. An angular velocity sensor as claimed in claim 1, wherein said end portion of said vibratory member to which said support members are connected are rectangular in cross-section.

4. An angular velocity sensor as claimed in claim 1, wherein a ratio of said length of said first side to said length between said second and third sides is in a range of between 0.975 and 0.995.

* * * * *